United States Patent [19]

Lukis et al.

[11] Patent Number: 5,519,426
[45] Date of Patent: May 21, 1996

[54] METHOD FOR CONTROLLING A THERMAL PRINTER TO INCREASE RESOLUTION

[75] Inventors: Lawrence J. Lukis, Prior Lake; Danny J. Vatland, Chanhassen, both of Minn.

[73] Assignee: LaserMaster Corporation, Eden Prairie, Minn.

[21] Appl. No.: 146,506

[22] Filed: Nov. 1, 1993

[51] Int. Cl.$^6$ ........................................................ B41J 2/35
[52] U.S. Cl. ............................ 347/211; 347/171; 347/188
[58] Field of Search .................................. 347/211, 171, 347/188; 400/120.09, 120.01

[56] References Cited

U.S. PATENT DOCUMENTS

| | | | |
|---|---|---|---|
| 4,262,188 | 4/1981 | Beach | 219/216 |
| 4,268,179 | 5/1981 | Long et al. | 400/120 |
| 4,305,024 | 4/1984 | Moriguchi et al. | 346/140 R |
| 4,524,368 | 6/1985 | Inui et al. | 346/76 PH |
| 4,534,203 | 6/1985 | Adkisson et al. | 346/76 PH |
| 4,556,891 | 12/1985 | Matsushita et al. | 346/76 PH |
| 4,701,836 | 10/1987 | Horlander | 346/76 PH |
| 4,712,930 | 12/1987 | Maruno et al. | 400/120 |
| 4,731,618 | 3/1988 | Shimazaki | 346/1.1 |
| 4,779,102 | 10/1988 | Sasaki | 346/76 PH |
| 4,783,667 | 11/1988 | Brooks | 346/76 PH |
| 4,786,917 | 11/1988 | Hauschild et al. | 346/76 PH |
| 4,789,870 | 12/1988 | Lacord et al. | 346/1.1 |
| 4,809,121 | 2/1989 | Nehls | 361/1 |
| 4,847,641 | 7/1989 | Tung | 346/154 |

(List continued on next page.)

FOREIGN PATENT DOCUMENTS

| | | |
|---|---|---|
| 0223979A1 | 6/1987 | European Pat. Off. . |
| 0512475 | 11/1992 | European Pat. Off. . |
| 56-58885 | 5/1981 | Japan . |
| 2-39951 | 2/1990 | Japan . |
| WO92/06554 | 4/1992 | WIPO . |
| WO92/06555 | 4/1992 | WIPO . |

OTHER PUBLICATIONS

Stiedel, L., "Technology Overview: Resolution Enhancement Technologies For Laser Printers", LaserMaster Corporation, 1991.

IEE Proceedings–A, "Measurement of Thermal Transients In A Thermal Print Head Used For Dye Diffusion Colour Printing" by P. W. Webb and R. A. Hann, vol. 138, No. 1, Jan. 1991, pp. 98–100.

Electronics and Communications in Japan, "Design of a Thermal Print Head for High–Speed and High–Resolution Printing" by Susumu Shibata and Takashi Kanamori, Part 2, vol. 75, No. 6, 1992, pp.101–111.

Journal of Imaging Technology, "Dye Diffusion Thermal Transfer (D2T2) Color Printing" by R. A. Hann and N. C. Beck, vol. 16, No. 6, Dec. 1990, pp. 238–241.

Application Notes for Kyocera Thermal Printheads, Revision #5, Aug. 23, 1991, pp. 1–25, Kyocera Corporation of Kyoto, Japan.

Primary Examiner—Huan H. Tran
Attorney, Agent, or Firm—Kinney & Lange

[57] ABSTRACT

A method for controlling binary thermal printers increases the effective output resolution of the thermal printer above the native resolution of a print head having a plurality of individual resistive heating elements arranged in a print line. An increase in the effective resolution of a binary output image is achieved by using an over-drive energy to control a relative position of a binary edge of a pixel image at a resolution that is less than the native resolution of the thermal printer. In a preferred embodiment, an under-drive energy may also be used with an adjacent over-drive energy to further control the relative position of the binary image of the pixel image. The over-drive energy is higher than a native pixel drive energy, but lower than a maximum drive energy. The native pixel drive energy produces a binary pixel image having a native area corresponding to the native resolution of the thermal printer. The binary pixel image on the print media corresponding to the heating elements to which the over-drive energy is applied are increased in area beyond the native area of the thermal printer, thereby enabling the thermal printer to realize an increase in an effective resolution of the binary image.

33 Claims, 9 Drawing Sheets

U.S. PATENT DOCUMENTS

| | | | |
|---|---|---|---|
| 4,859,093 | 8/1989 | Plotnick | 400/120 |
| 4,872,772 | 10/1989 | Tsukamoto | 400/120 |
| 4,887,092 | 12/1989 | Pekruhn et al. | 346/1.1 |
| 5,005,139 | 4/1991 | Tung | 346/519 |
| 5,009,527 | 4/1991 | Yana et al. | 400/120 |
| 5,029,108 | 7/1991 | Lung | 346/519 |
| 5,041,848 | 8/1991 | Gilbert et al. | 346/108 |
| 5,055,943 | 10/1991 | Kishida | 358/459 |
| 5,066,961 | 11/1991 | Yamashita | 346/76 PH |
| 5,075,698 | 12/1991 | Aoki et al. | 346/1.1 |
| 5,081,471 | 1/1992 | Thomas | 346/76 PH |
| 5,086,306 | 2/1992 | Sasaki | 346/76 PH |
| 5,089,831 | 2/1992 | Ito et al. | 346/76 PH |
| 5,109,235 | 4/1992 | Sasaki | 346/76 PH |
| 5,122,884 | 6/1992 | Gilbert et al. | 358/298 |
| 5,134,495 | 7/1992 | Frazier et al. | 358/298 |
| 5,142,301 | 8/1992 | Matsumoto | 346/76 PH |
| 5,163,760 | 11/1992 | Nardozzi | 400/120 |
| 5,170,179 | 12/1992 | Chen et al. | 346/76 PH |
| 5,193,008 | 3/1993 | Frazier et al. | 358/298 |
| 5,204,704 | 4/1993 | Genno et al. | 346/76 PH |
| 5,216,440 | 6/1993 | Aoyagi | 346/76 PH |
| 5,235,345 | 8/1993 | Ohno et al. | 346/76 PH |
| 5,248,995 | 9/1993 | Izumi | 346/76 PH |
| 5,264,866 | 11/1993 | Nagahisa | 346/76 PH |
| 5,268,706 | 12/1993 | Sakamoto | 346/76 PH |

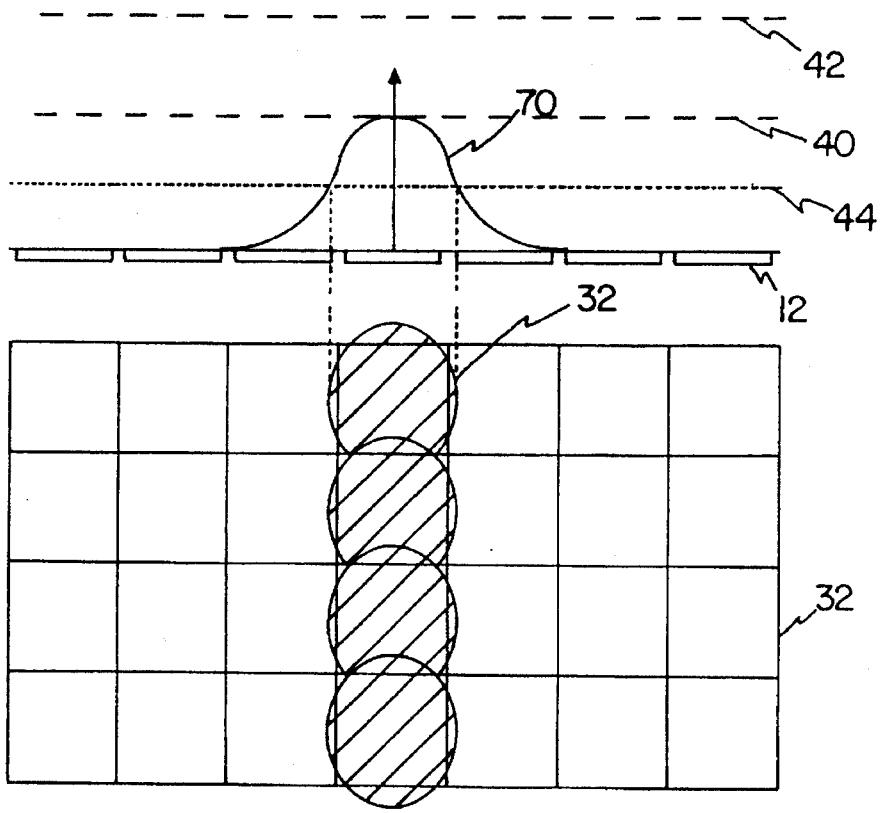
Fig. 4a
Fig. 4b
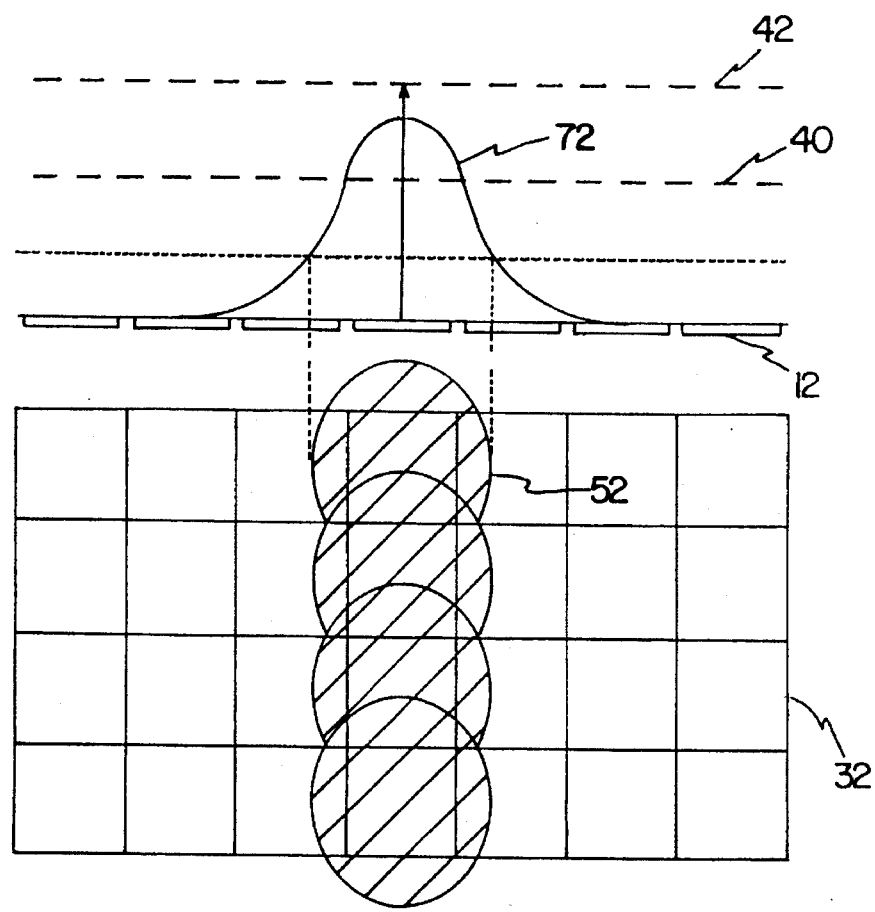
Fig. 5a
Fig. 5b

METHOD FOR CONTROLLING A THERMAL PRINTER TO INCREASE RESOLUTION

BACKGROUND OF THE INVENTION

1. Field of the Invention

The present invention relates generally to thermal printers, and, more particularly, to a method for controlling a thermal printer so as to increase the effective output resolution of the thermal printer, and thereby increase the visual quality of the output image printed by the thermal printer.

2. Background of the Invention

It is well known that the resolution of a printer will largely determine the quality of the output image produced by that printer. The higher the resolution in terms of dots per inch (dpi), the better the quality. For printers that have native resolutions greater than about 1000 dpi, it is difficult for the human eye to discern individual dots or pixels in the printed output. For printers with native resolutions below about 1000 dpi, the appearance of discernable dots or pixels can reduce the overall quality of the output image. As would be expected, however, the cost and complexity of higher resolution printers having native resolutions greater than about 1000 dpi is significantly greater than for lower resolution printers having native resolutions less than about 1000 dpi. Consequently, numerous techniques have been developed in an attempt to increase the image quality of lower resolution printers so as to more closely simulate the image quality of more expensive higher resolution printers.

Unlike other types of printers, such as laser printers or ink jet printers, there are presently no thermal printers which are capable of producing high resolution outputs that are greater than 1000 dpi. Currently, the highest resolution thermal printers produce images of about 400 dpi by advancing a medium past a row or line of resistive heating elements arranged, for example, in a print line positioned across a page to be printed. Individual resistive heating elements in the print head are activated by an input pulse to produce a single print line of pixel images on a print medium. The resulting image is recorded on the print medium either by thermal activation of a marking, material embedded in the medium or by thermal transfer of a wax or film onto the medium. The vertical output resolution of such a thermal printer is a function of how far the print medium is advanced past the print head for each print cycle, but the horizontal output resolution of the thermal line printer is dictated by the physical pitch or center-to-center distance between adjacent heating elements in the print head. Because the pitch is a physical parameter of the print head, the horizontal output resolution effectively becomes the fixed resolution for a thermal printer.

Due to a variety of limitations involved in creating very small, yet very precise, resistive heating elements, it has been impractical to construct a thermal print head with resistive elements at pitches greater than about 400 dpi. For example, one of the biggest problems in creating higher density print heads has been connecting each heating element with its corresponding driver circuit such that the heating elements, driver circuits and connections can all be positioned on the same substrate. Though these problems may be solved in the future to allow for production of higher resolution, more expensive print heads, the native resolution of existing thermal printers is limited to values below about 400 dpi. While this would seem to provide even more reason to attempt to increase the image quality of thermal printers, the focus of most efforts to enhance thermal printers has been to improve the output consistency, and not the effective output resolution, of thermal printers.

A great many techniques have been developed to control thermal print heads so as to produce consistent and reliable output images with high pixel-to-pixel consistency between successive print lines. Various hysterisis control techniques have been developed to correct for differences in the temperature of the print head between successive print cycles, as shown, for example, in U.S. Pat. Nos. 4,859,093 and 5,235,345. Similarly, various techniques have been developed to correct for end of line differences encountered in the use of carriage-type thermal print heads, as shown, for example, in U.S. Pat. Nos. 4,789,870 and 4,872,772. Another technique to compensate for residual temperature differences in the print head uses a staggered print head with alternating even and odd print pixels, as shown, for example, in U.S. Pat. No. 4,779,102. While all of these techniques may improve the pixel-to-pixel consistency between successive print lines printed by a thermal printer, none of these control systems can offer an increase in the effective output resolution of the thermal printer.

In an effort to increase the apparent resolution of thermal printers, grey scale or gradiated thermal printers have been used, as shown, for example, in U.S. Pat. Nos. 4,524,203 and 5,216,440. In a grey scale printer, the native pixel resolution of the thermal printer is not increased; instead, a visual illusion of higher resolution is produced by printing each of the pixels at different optical density levels, and then relying on the human eye to perform the smoothing operation as the image is viewed. As a result, the effective output resolution of the image is not actually increased, only its apparent resolution is increased. In other words, there is no actual change in the size of the pixel images that are printed, only the optical density of the pixel images is altered in order to obtain a perceived increase in image quality. The problem with this approach is that special grey-scale print media are required in order to reproduce grey-scale images, as opposed to binary images. Consequently, in those situations where a true binary output image is required, such as when a master print for a printing press operation is desired, a grey scale output image is not acceptable.

Although no techniques have been developed to increase the effective output resolution of thermal printers, techniques have been developed for other types of low resolution printers to increase the effective output resolution of those devices. For lower resolution laser printers, for example, three of the most popular resolution enhancement techniques are represented by U.S. Pat. Nos. 5,041,848 issued to Gilbert et al., U.S. Pat. No. 5,193,008 issued to Frazier et al., and 5,005,139 issued to Tung. In U.S. Pat. No. 5,041,848, the marking engine is modulated by a raster scan line that has a higher horizontal frequency than the native vertical frequency of the marking engine so as to create a non-square pixel image. The output image is smoothed by selectively modifying pixel values on either side of any vertical transition points of an ideal image outline as each scan line is rasterized. In U.S. Pat. No. 5,193,008, the effective resolution of the output image is increased by doubling the resolution of the image in a frame buffer holding the scan lines and then reading a pair of scan lines together and comparing vertically adjacent pixels to generate the raster scan line signal that will actually modulate the marking engine. In U.S. Pat. No. 5,005,139, the smoothing takes place after the scan lines have been rasterized by comparing a sample window from a group of scan lines to a number of matching bit patterns or templates. If a match is found, then the central bit of the sample window is modified in an attempt to smooth the output image by using a narrower output pixel, for example. For a more detailed explanation of these resolution enhancement techniques for laser printers, reference is made to Stiedel, L., "Technology Overview: Resolution Enhancement Technologies for Laser Printers", LaserMaster Corporation, 1991.

While these types of resolution enhancement techniques have proven effective when applied to the marking engines of laser printers, they are not applicable to thermal printers for a number of reasons. Generally, there is very little crossover between techniques that work on laser printers and techniques that work for thermal printers. This is due to the fact that the fundamental marking operations of each printer are so different. In addition, the physical limitations of each printer that affect the output resolution are effectively opposite one another. In a laser printer, the vertical resolution is effectively fixed and the horizontal resolution can be increased by increasing the modulation frequency at which the laser scans the photoconductor drum. In a thermal printer, on the other hand, the horizontal frequency is fixed due to the physical pitch of the heating elements and the vertical resolution is the only resolution which can be altered. As a result, techniques for a laser printer cannot be plugged into a thermal printer with an expectation that similar results will be achieved.

In a laser printer, an electrical charge is produced on a rotating imaging drum by scanning the laser across the drum in response to a modulated output signal representative of the image to be printed. After the charge image is formed on the imaging drum, it is rotated past a toner applicator and attracts oppositely charged toner particle to the drum. Finally, the toner particles on the toner drum are transferred to a print medium, such as a sheet of paper, and the toner is then fixed or fused onto the print medium. The resolution enhancement techniques described above take advantage of the fact that the imaging drum acts as a kind of additive accumulator of charge over time. Consequently, it is possible to create pixel images that are smaller than the native pixel resolution of the marking engine of the laser printer by accumulating charge between successive raster scans, for example, to generate a region of overlapped charge. Due to the relatively long charge retention time of the imaging drum, this region of overlapped charge acts as a large-scale temporal charge accumulator that can be controlled to create pixel images smaller than the native resolution when the toner is attracted to the overlapped charge areas on the imaging drum.

There is nothing in a thermal printer, however, that is equivalent to a large-scale temporal charge accumulator necessary to facilitate the types of resolution enhancement techniques described above. In a thermal printer, the resistive heating elements provide the printing energy and are essentially equivalent to the laser in a laser printer. The marking material or the wax fixes the intended image and is essentially equivalent to the toner and fuser. There is, however, no direct equivalent in a thermal printer to the imaging drum in a laser printer. Consequently, the enhancement techniques used with laser printers are not applicable to thermal printers.

Although thermal printers are now capable of producing consistent and reliable quality output images, particularly at lower resolutions, there has been no effort to increase the effective resolution of such thermal printers. Consequently, it would be advantageous to provide a method and apparatus for controlling thermal printers that could increase the effective output resolution of thermal printers above the native resolution of the print head.

SUMMARY OF THE INVENTION

The present invention is a method for controlling binary thermal printers that increases the effective output resolution of the thermal printer above the native resolution of a print head having a plurality of individual resistive heating elements arranged in a print line. An increase in the effective resolution of a binary output image is achieved by using an over-drive energy to control a relative position of a binary edge of a pixel image at a resolution that is higher than the native resolution of the thermal printer. In a preferred embodiment, an under-drive energy may also be used with an adjacent over-drive energy to further control the relative position of the binary image of the pixel image.

The over-drive energy utilized by the present invention is higher than a native pixel drive energy, but lower than a maximum drive energy for the thermal printer. The native pixel drive energy is an amour of energy that is applied to a heating element in order to produce a binary pixel image having a native area corresponding to the native resolution of the thermal printer. The maximum drive energy is an amount of energy that is applied to a heating element above which a thermal transfer of the binary pixel image will not consistently produce a uniform quality printed image. The binary pixel image on the print media corresponding to the heating elements to which the over-drive energy is applied are increased in area beyond the native area, thereby enabling the thermal printer to realize an increase in an effective resolution of the binary image. The under-drive energy is lower than the native pixel drive energy, and the binary pixel images on the media corresponding to the heating elements to which the under-drive energy is applied are formed contiguously with a corresponding heating element to which an over-drive energy is applied and are smaller in area than the native area of the thermal printer.

In accordance with a first embodiment of the invention, an improved method is provided for controlling a thermal printer that generates binary images on a print media by selectively heating or not heating a plurality of individual resistive heating elements arranged in a print line. Each heating element is operable in response to a corresponding drive energy generated by a driver circuit that is operably coupled to a pixel representation of the image. The thermal printer has a native resolution across the print line that corresponds to a center-to-center distance between adjacent heating elements and has a native pixel drive energy that is applied to a heating element in order to produce a binary pixel image having a native area corresponding to the native resolution of the thermal printer. The improved method comprises the step of providing each of one or more selected heating elements with an over-drive energy that is higher than the native pixel drive energy, but lower than a maximum drive energy for the thermal printer above which a thermal transfer of the binary pixel image will not consistently produce a uniform quality printed image. By using the over-drive energy, the binary pixel images on the print media corresponding to each of the selected heating elements are increased in area beyond the native area of the thermal printer thereby enabling the thermal printer to realize an increase in an effective resolution of the binary image.

In accordance with a second embodiment of the invention, a method is provided for rendering and outputting a line art image to a binary thermal printer. The pixel representation which is rendered comprises a plurality of raster scan lines, each raster scan line having a plurality of pixel elements, each pixel element corresponding to a unique heating element in the print line of the thermal printer. The method comprises the steps of providing a processor with an ideal outline of the line art image, using the processor to rasterize the ideal outline of the line art image to store the pixel representation of the line art image in a frame buffer memory, and communicating the pixel representation stored in the frame buffer memory to the thermal printer such that the thermal printer may print the smoothed line art image. In the rasterization step, a series of steps are performed for each raster scan line in the pixel representation. First, there is a determination of whether there are any outline boundaries where the ideal outline crosses the raster scan line. For any pixel elements in the raster scan line which are completely outside an outline boundary, a pixel drive value is stored in the frame buffer memory corresponding to that pixel element which results in a drive energy that generates no binary pixel image. For any pixel elements which are partly inside an outline boundary, a pixel drive value is stored in the frame buffer memory corresponding to an adjacent pixel element that is completely inside the outline boundary which results in an over-drive energy. For all other pixel elements which are completely inside an outline boundary, a pixel drive value is stored in the frame buffer memory corresponding to that pixel element which results in a drive energy that is equivalent to the native pixel drive energy.

In accordance with a third embodiment of the present invention, a controller is provided with the pixel representation of a binary image, each pixel element in the pixel representation having a binary pixel value. The controller is used to smooth the binary image to be printed on a binary print media by performing a series of steps for each pixel element. First, for a subset of pixel elements within the pixel representation that are about the pixel element currently being processed, a determination is made if the pixel values of the subset of pixel elements match any one of a plurality of predefined template patterns. If there is no match of a template pattern, and if the pixel value of the pixel element currently processed is zero, a drive energy is applied to the heating element in the binary thermal printer that corresponds to the pixel element currently being processed that will produce no binary pixel image. If there is no match of a template pattern, and if the pixel value of the pixel element currently processed is one, a drive energy is applied to the heating element corresponding to the pixel element currently being processed that is equivalent to the native pixel drive energy. If there is a match of a template pattern, an over-drive energy is applied to the heating element corresponding to a pixel element adjacent to the pixel element currently being processed.

Enhancements to each embodiment include selectively choosing the over-drive energy from a plurality of predefined over-drive energy levels, using an under-drive energy that is lower than the native pixel drive energy for pixel elements adjacent a pixel element for which an over-drive energy is used, and increasing the vertical resolution of the thermal printer to allow the increase in resolution afforded by the present invention to be utilized more effectvely. In the under-drive energy embodiment, a neighbor effect is used to produce a pixel iamge with an area that is smaller in area than the native area of the thermal printer. The neighbor effect using the under-drive energy to form the smaller pixel image contiguously with the pixel image of a corresponding adjacent heating element to which an over-drive energy is applied. In this embodiment, the over-drive energy is provided during a first time that is less than about 1 ms apart from a second time during which the under-drive energy is provided to allow for interaction between the two adjacent drive energies.

BRIEF DESCRIPTION OF THE DRAWINGS

FIG. 4a is a pictorial graph of the heat energy associated with the production of a pixel image at native resolution.

FIG. 4b is a pixel representation of the output image formed by application of the heat energy of FIG. 4a over a series of four lines.

FIG. 5a is a pictorial graph of the heat energy associated with the production of a pixel image having an increased size beyond the size of the native resolution by virtue of a higher heat energy provided in accordance with the present invention.

FIG. 5b is a pixel representation of the output image formed by application of the heat energy of FIG. 5a over a series of four lines.

DESCRIPTION OF THE PREFERRED EMBODIMENT

Figure 1A:
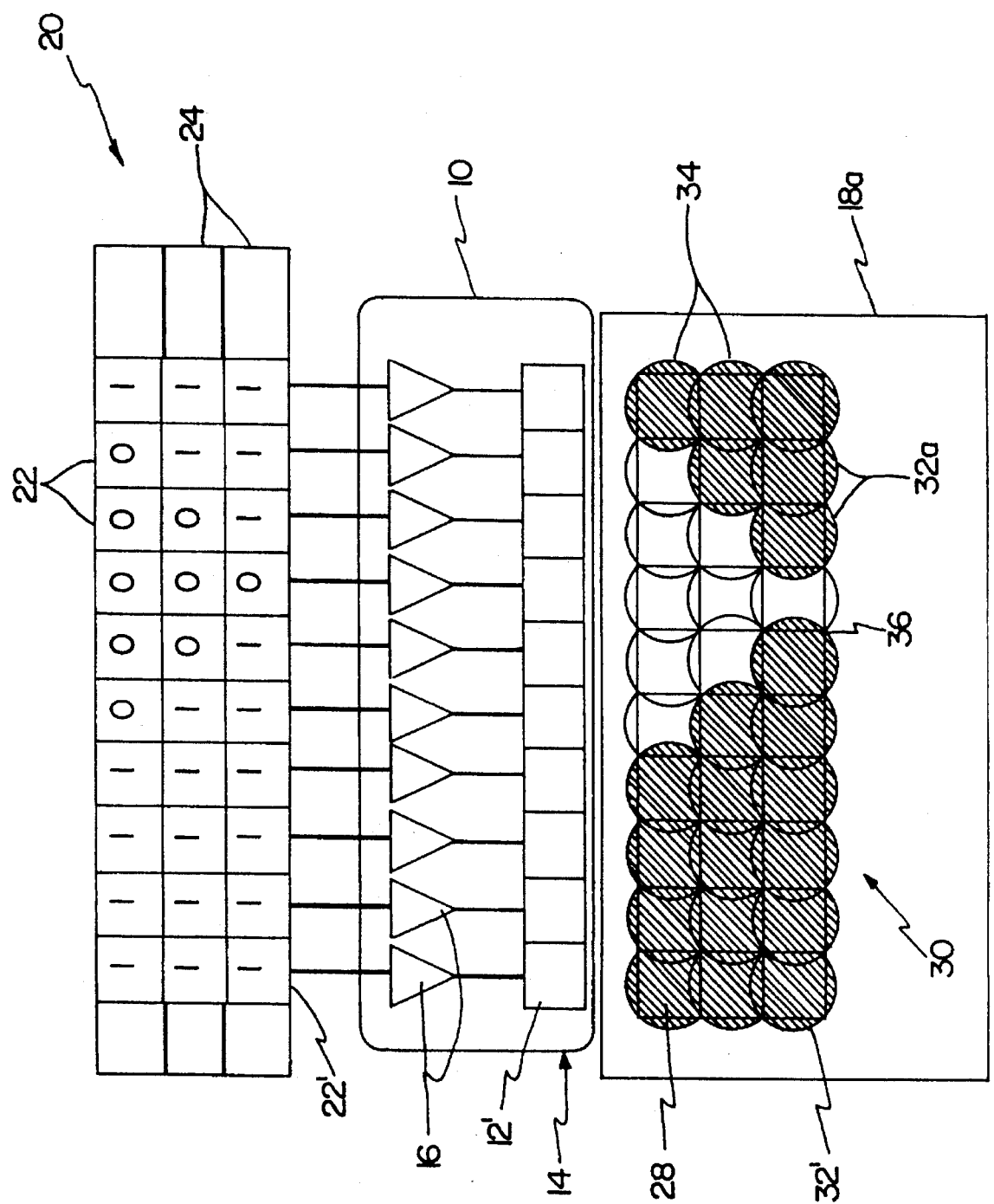
FIGS. 1a and 1b are schematic representations of existing techniques for controlling a binary and a grey scale thermal printer.
Figure 1B:
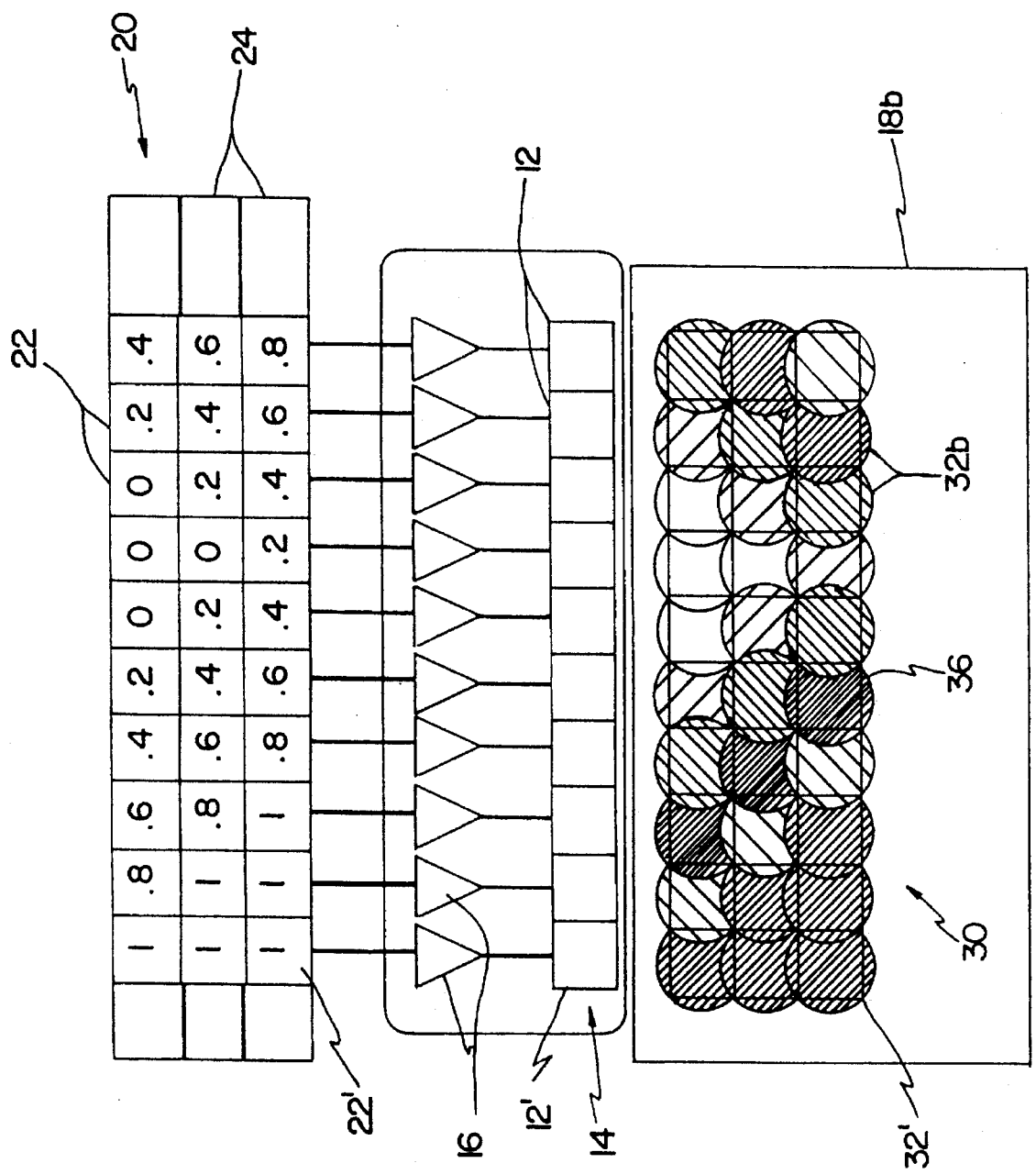

With reference to FIGS. 1a and 1b, examples of existing techniques for controlling both a binary thermal printer, FIG. 1a, and a grey scale thermal printer, FIG. 1b, are shown. In each of these examples, the thermal printer includes a print head 10 having a plurality of individual resistive heating elements 12 arranged in a print line 14. Each heating element 12 heats up or cools down in response to a corresponding pixel drive energy that is supplied by driver circuit 16 that is also part of print head 10. The heat energy produced by heating elements 12 activates a thermal transfer process that records a printed image 30 on a print medium 18. In existing thermal printers, printed image 30 is recorded on the print medium either by thermal activation of a marking material embedded in print medium 18 or by thermal transfer of a wax or film onto print medium 18. The input to drive circuits 16 is operably coupled to a pixel representation 20 of the image to be printed, with pixel elements 22 defined in each of a plurality of scan lines 24 of pixel representation 20 so as to correspond to a unique heating element 12 in print line 14. In this way, a pixel value stored in pixel element 22', for example, will cause heating element 12' to produce a pixel image 32'.

For purposes of the present invention, the native resolution of a thermal printer is defined as the center-to-center distance or pitch between adjacent heating elements 12 in print line 14. Due to the fact that a pixel image 32 will have a generally round area, rather than a rectangular area, the area of a corresponding ideal pixel element 22 is defined to be essentially equal to the area of a rectangle which can be circumscribed within the generally round area of a pixel image 32 printed at the native resolution of print head 10 as shown, for example, at 28. The actual area or native area of a pixel image 32 printed at the native resolution of print head 10 is simply the area of the shape which circumscribes the rectangular area of the ideal pixel element 22. Pixel elements 22 are defined in this manner so as to prevent, for example, any "white" space from appearing in output image 30 between adjacent pixel images 32 which are to be printed as "black". Consequently, the periphery shape of the native area of pixel image 32 must have sufficient overlap at its edges to completely contain ideal pixel element 22 within its periphery.

It will be understood that the horizontal dimension of ideal pixel element 22 at the native resolution of the printer is dictated by the the pitch between adjacent heating elements 12, and, as indicated in the background section, the vertical dimension of most thermal printers can be variable depending upon how far print media 18 is moved by print line 14 on each print cycle. For simplicity and ease of control, existing thermal printers usually match the relatively flexible vertical dimension to the relatively fixed horizontal dimension, thereby causing pixel elements 22 in the pixel representation 20 to be square in shape. For a thermal printer that is designed to print a square pixel element 22 at the native resolution of print head 10, the ideal area at the native resolution of the thermal printer would correspond to $P^2$, where P is the pitch of print head 10 and the effective distance of any side of square pixel element 22. In this example, if each heating element 12 produced a perfectly circular pixel image 32, then the native area for the thermal printer would be essentially equivalent to $\pi R^2$, where R is the radius of the circumscribed circle and is equal to 0.70711P. It will be understood that the actual periphery shape of native area, and hence the actual area for pixel image 32 at the native resolution of the thermal printer will be a function of the particular thermal print head 10 and specific thermal transfer process, and may vary somewhat from printer to printer.

A native pixel drive energy is defined as the amount of energy which must be applied to a heating element 12 in order to produce a pixel image 32 having an area corresponding to the native area of the thermal printer. In actuality, because the periphery of pixel image 32 varies as a function of the energy applied to heating element 12, there will be slight variations in the degree to which the native area of pixel image 32 overlaps the ideal area of pixel element 22. This variance between the native area of pixel image 32 and the ideal area of pixel element 22 at the native resolution is due to the nature of the thermal transfer process and the problems in controlling the amount of heat energy transferred from heating elements 12 to print media 18. As discussed in the background art section, the vast majority of effort in improving the overall quality of the output image of thermal printers has focused on minimizing this variance to produce images with very high pixel-to-pixel consistency between successive print lines 34.

Referring now to FIG. 1b, an output image 30 for a grey scale thermal printer is shown. While the output image 30 shown in FIG. 1b may be more aesthetically pleasing to view at a distance, the native resolution of FIG. 1a is identical to the native resolution of FIG. 1b. The difference between a thermal printer which generates binary images on print media 18, as shown in FIG. 1a, and a thermal printer which generates grey scale images on print media 18, as shown in FIG. 1b, is primarily a function of the print media 18. For both types of printers, there is a given pixel drive energy that, when applied by driver circuit 16 to heating element 14, will produce a pixel image 32 having a native area corresponding to the native resolution of the thermal printer and an effective optical density of 1.0, corresponding to a "black" pixel. For grey scale thermal printers, however, the print media 18 is capable of producing pixel images 32 which have effective optical densities lower than 1.0, but greater than 0.0, in response to drive energies that are less than the given pixel drive energy. In contrast, a binary thermal printer cannot print grey scale pixels when provided with a drive energy less than the given pixel drive energy.

Figure 2:
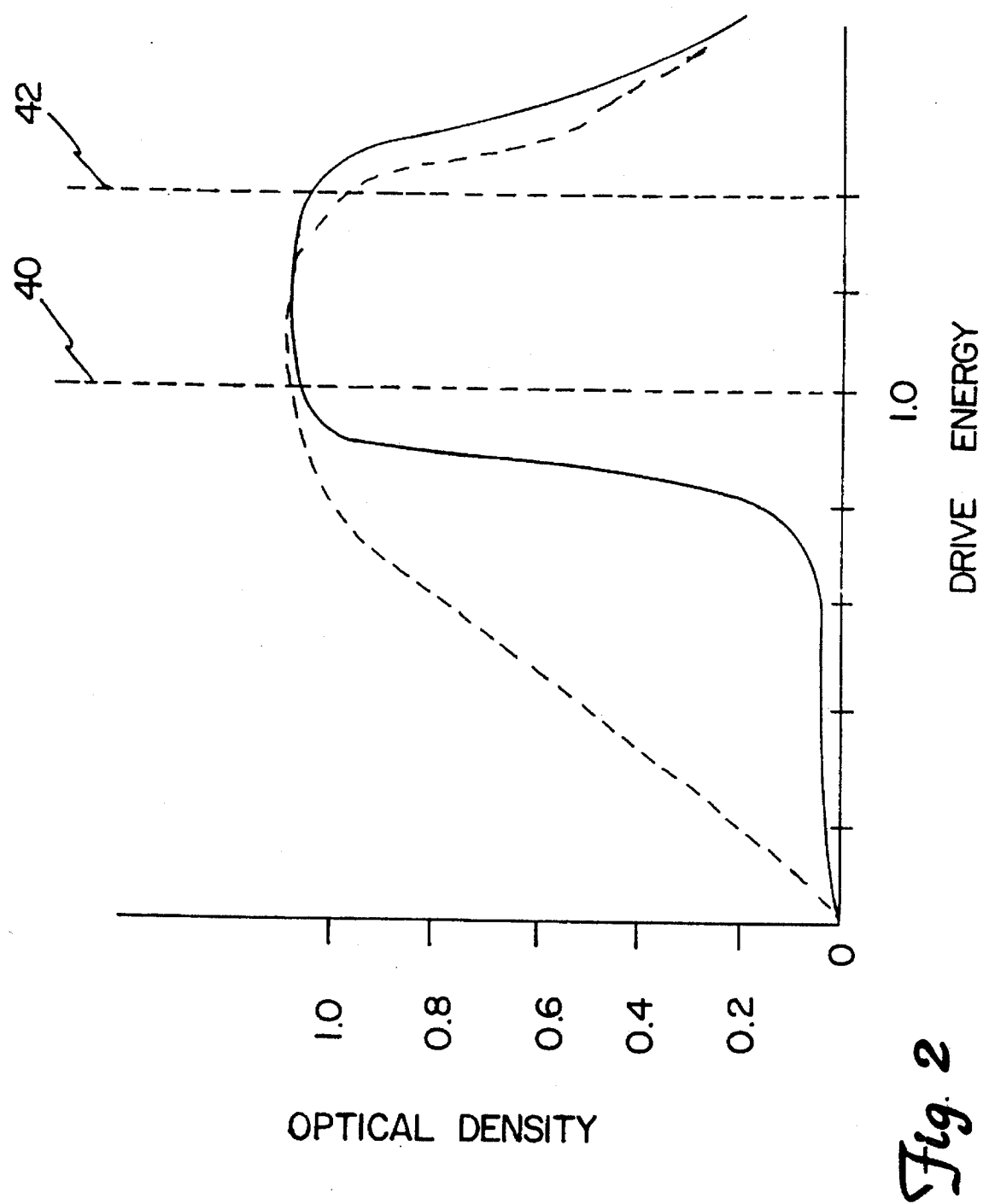
FIG. 2 is a graphic representation of the transfer function of a binary and a grey scale thermal printer.

The difference between binary and grey scale thermal printers can be seen by examining FIG. 2 showing a graph of the transfer function for each type of printer in terms of optical density of the pixel image versus drive energy. For ease of reference, the drive energy is shown as a normalized variable with the value of 1.0 representing a native pixel drive energy 40 which must be applied to a heating element 12 in order to produce a pixel image 32 having an area corresponding to the native area of the thermal printer. For a grey scale thermal printer, the optical density of grey scale print media 18a responds in a generally linear fashion to an increase in drive energy up to native pixel drive energy 40. For a binary thermal printer, the optical density of binary print media 18b behaves as a step function with no output below native pixel drive energy 40 and unitary optical density above native pixel drive energy 40.

For both types of print media 18, there is a maximum energy transfer point 42 above which a thermal transfer of a pixel image 32 will not consistently produce a uniform quality printed image. Depending upon the characteristics of the thermal transfer, maximum energy transfer point 42 represents that energy above which the marking material melts, boils or otherwise encounters a thermal breakdown. To avoid these problems, all existing thermal printers, both binary and grey scale, operate at a native pixel drive energy 40 that is substantially below the maximum energy transfer point 42 for that particular thermal printer.

Figure 3:
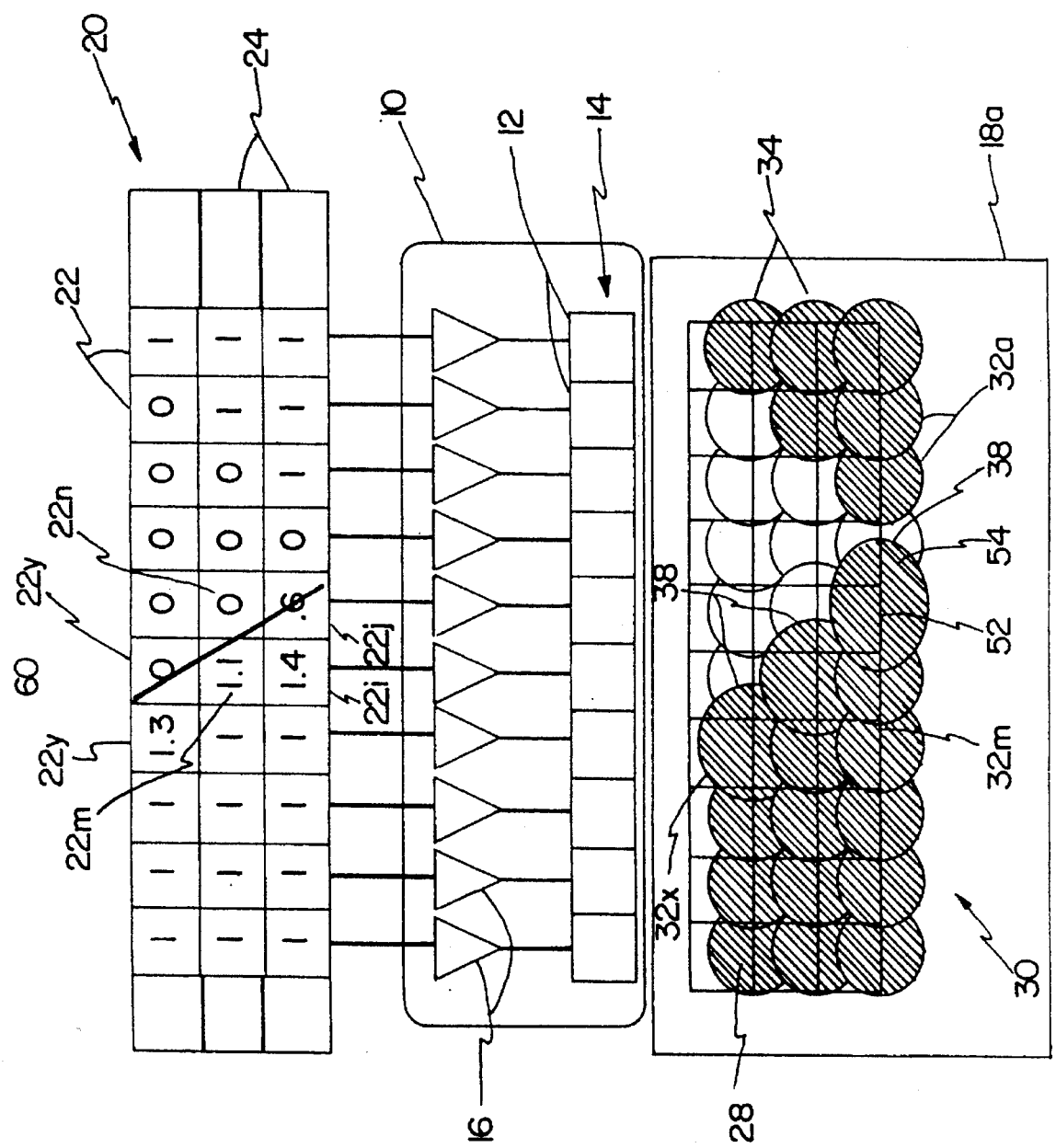
FIG. 3 is a schematic representation of the technique for controlling a thermal printer in accordance with a preferred embodiment of the present invention.

Referring now to FIG. 3, a schematic representation of the technique for controlling a thermal printer in accordance with a preferred embodiment of the present invention is shown. Instead of trying to control the drive energy to obtain a high pixel-to-pixel consistency between successive print lines 34, the present invention controls the drive energy to control an edge position 38 of a binary pixel image 32 at a resolution that is higher than the native resolution of the thermal printer. Thus, even though the present invention cannot print a single 1000 dpi pixel image, for example, the present invention can effectively control the edge of a larger output image to a resolution of 1000 dpi or greater. As used within the present invention, the term effective resolution is defined as the smallest increment at which an edge of an output image comprised of multiple pixel images 32 can be resolved, in contrast to the definition of the term native resolution which is defined to be the smallest individual pixel image which can be printed by the thermal printer.

The present invention is applicable to thermal printers which print binary pixel images 32a, such as shown in FIG. 1a, as compared to grey scale pixel images 32b, such as shown in FIG. 1b. Consequently, print media 18a for use with the present invention must be a binary thermal print media. The reason why the present invention is limited to binary print images 32a is that the present invention uses novel over-drive and under-drive energies to effectively control the relative position of binary edge 38 of the binary pixel image 32a at a resolution that is less than the native resolution of the thermal printer. If a grey scale print media 18b were used, the novel effect of the present invention would be replaced by an altered optical density transfer function. In other words, using a grey scale print media 18b with the present invention would simply result in a change to the grey scale values produced, and would not result in any increase in the effective resolution of the thermal printer.

The present invention improves on the method of controlling a binary thermal printer as shown and described in FIG. 1a by providing each of one or more selected heating elements 12 with an over-drive energy. In terms of the graph of drive energy shown in FIG. 2, the over-drive energy provided by the present invention is higher than native pixel drive energy 40, but lower than maximum energy transfer point 42 for the thermal printer. As a consequence of driving heating element 12 with the over-drive energy, the corresponding binary pixel image 152 recorded on print media 18 is increased in area beyond the native area of the thermal printer, as shown in FIG. 3. This increase in area enables a thermal printer operated in accordance with the present invention to realize an increase in an effective resolution of the binary image 30 by controlling the relative position of binary edge 38 of binary pixel image 52 at a resolution that is less than the native resolution of the thermal printer. In the preferred embodiment, the over-drive energy can be selectively chosen from a plurality of predefined over-drive energy levels depending upon the desired relative position of binary edge 38.

In a preferred embodiment, the present invention also utilizes an under-drive energy which can be applied to each of one or more selected heating elements 12 that are adjacent a corresponding selected heating element 12 which are being driven with an over-drive energy. The under-drive energy that is lower than native pixel drive energy 40, and therefor will not create a binary pixel image 32 by itself. Due to the fact that the under-drive energy is applied adjacent to a heating element which is being driven with an over-drive energy, however, a binary pixel image 54 corresponding to each of the heating elements 12 driven with the under-drive energy level is formed contiguously with binary pixel image 52 recorded by the corresponding adjacent heating element being driven by the over-drive energy. Due to the fact that binary pixel image 54 is created from the overlap of the over-drive energy and the under-drive energy, binary pixel image 54 is smaller in area than the native area of the thermal printer.

Preferably, the over-drive energy that is provided to the corresponding selected heating element 12 for pixel 52 is provided during a first time that is less than about 1 ms apart from, and preferably overlapping with, a second time during which the under-drive energy is provided to the selected adjacent heating element 12 for pixel 54. This temporal overlap is essentially dictated by the length of time which heating elements 12 can retain their heat energies at a level sufficient to accomplish the overlapping of drive energies between adjacent heating elements. As most heating elements 12 are designed to dissipate their heat energy fairly rapidly, if adjacent heating elements 12 are not driven together with the over-drive energy and the under-drive energy within this overlap time period, then there is no opportunity for the interaction of adjacent pixel images.

In the preferred embodiment, the over-drive energy is generated in response to a determination based on the values of each pixel element 22 in pixel representation 20. In the example shown in FIG. 3, an ideal outline 60 at the right hand edge of the image 30 to be printed is shown intersecting scan lines 24. For each pixel element 22 through which ideal outline 60 passes, a determination is made as to what proportion of that pixel element 22 is inside ideal outline 60. The proportion inside ideal outline 60 for pixel element 22x, for example, is about 30%. Consequently, pixel element 22y is provided with a pixel value of 1.3 which, when applied to driver 16, will produce an overdrive energy that swells pixel edge 38 for pixel image 32x to the right, thereby causing pixel image 32x to overlap and occupy about 30% of pixel image 32y. A similar phenomenon happens for pixel elements 32m and 32n, and pixel images 32n and 32m in the next image line 34. For the last image line 34, both an over-drive energy and an under-drive energy are used to create pixel images 52 and 54 as described above. In this case, pixel elements 22i and 22j are provided with pixel values of 1.4 and 0.6, respectively, to generate the over-drive energy and the under-drive energy. By applying the over-drive energy and the under-drive energy together, pixel 52 is extended in size as compared to the native resolution, and is formed contiguously with pixel 54 which is reduced in size as compared to the native resolution. The contiguous pixel image 52–54 recorded by this overlap occupies 100% of the area of pixel element 22i and about 60% of the area of pixel element 22j.

In the preferred embodiment, a decision to use the combined and overlapped over-drive energy and under-drive energy is made if a proportion of an area of a pixel image 54 to be printed is greater than a first percentage of the native area and less than a second percentage of the native area, the second percentage being greater than the first percentage. The values of the first and second percentage will vary depending upon the particular characteristics of the thermal printer and the print media 18. Typical percentages for the first percentage might range from 20–50% and for the second percentage might range from 80–100%. In an alternate embodiment, the proportion of the area of the pixel element 22 is compared to more percentages than just the first and second percentage and the over-drive and under-drive energies are chosen from a plurality of predefined over-drive and under-driven energy levels. In another embodiment, the under-drive energy and the over-drive energy are determined as a pair of values based upon the proportion of the area of the pixel element 12 to pixel image 54. In this embodiment, a known lookup table procedure can be used, for example, to compare the proportion of the area of the pixel element 22 and provide a chosen pair of values for the under-drive energy and the over-drive energy.

In another alternate embodiment, a controller or processor (not shown) is provided with the pixel representation 20 of the image. The controller smooths binary pixel images 32 to be printed on print media 18 by performing a template matching operation for each pixel element 22, rather than an ideal outline comparison as described above. For a subset of pixel elements 22 within pixel representation 24 that are about the pixel element 22 currently being processed, a determination is made as to whether the pixel values of the subset of pixel elements 22 match any one of a plurality of predefined template patterns. The type of template patterns which may be used to smooth the output image 30 are known in the art of smoothing output images for dot matrix printers, for example, as shown by U.S. Pat. No. 4,847,641 issued to Tung. If there is no match with a template, and if the pixel value of the pixel element 22 currently processed is zero, a drive energy is applied to the heating element 12 corresponding to the pixel element 22 currently being processed that will produce no binary pixel image 32. If there is no match with a template, and if the pixel value of the pixel element 22 currently processed is one, a drive energy is applied to the heating element 12 corresponding to the pixel element 22 currently being processed that is equivalent to the native pixel drive energy 40. Finally, if there is a match with a template, an over-drive energy is applied to the heating element 12 corresponding to a pixel element 22 adjacent to the pixel element 22 currently being processed that is higher than the native pixel drive energy 40, but lower than a maximum transfer energy 42 for the thermal printer. As with the option of directly generating the drive energies and generating the drive energies from a comparison of an ideal outline with a pixel representation of the image, the option of comparing the pixel representation with a plurality of predefined smoothing templates may be combined with the under-drive embodiment.

Referring now to FIGS. 4a and 4b, and FIGS. 5a and 5b, the specific manner in which the swelling operation of the present invention is accomplished will be explained. FIG. 4a shows a pictorial graph of the heat energy associated with the production of an pixel image 32 at native resolution as shown in FIG. 4b. In FIG. 4a, each heating element 12 is driven by a voltage value, for example, to produce a heat energy curve 70 as shown. The effective diameter of pixel image 32 is controlled by the thermal transfer threshold 44. When heat energy 32 is above transfer threshold 44, the particular binary thermal transfer process is activated and pixel image 32 is produced. When heat energy 70 is below transfer threshold 34, no thermal transfer process occurs and no pixel image 32 is produced. It can be seen that the apex of heat energy curve 70 is at the native pixel drive energy 40 and is well below the maximum drive transfer point 42.

As indicated in the background section, all of the work on controlling thermal printers to date has focused on obtaining a consistent thermal transfer process, with high pixel-to-pixel consistency, as a function of the particular output voltage values used to heating elements 12. For example, if a particular heating element 12 was activated during a previous print line, the residual heat energy from that activation will cause a higher heat energy curve to be generated for that heating element 12 on a subsequent print line in response to application of an identical driving voltage. In addition, if it is desired to operate a binary thermal printer as fast as possible, the residual heat energy on heating element 12 should be maintained just below threshold 44, thereby minimizing the time required to cross threshold 44 in response to the drive voltage that is applied to heating element 12. Consequently, various hysteresis techniques have been developed to track the heating history of each heating element 12 so as to minimize any change in heat energy curve 70 due to the prior heating history for heating element 12, and to control the residual heat energy of heating element 12 so as to operate the heating element 12 near threshold 44.

Figures 6A, 6B:
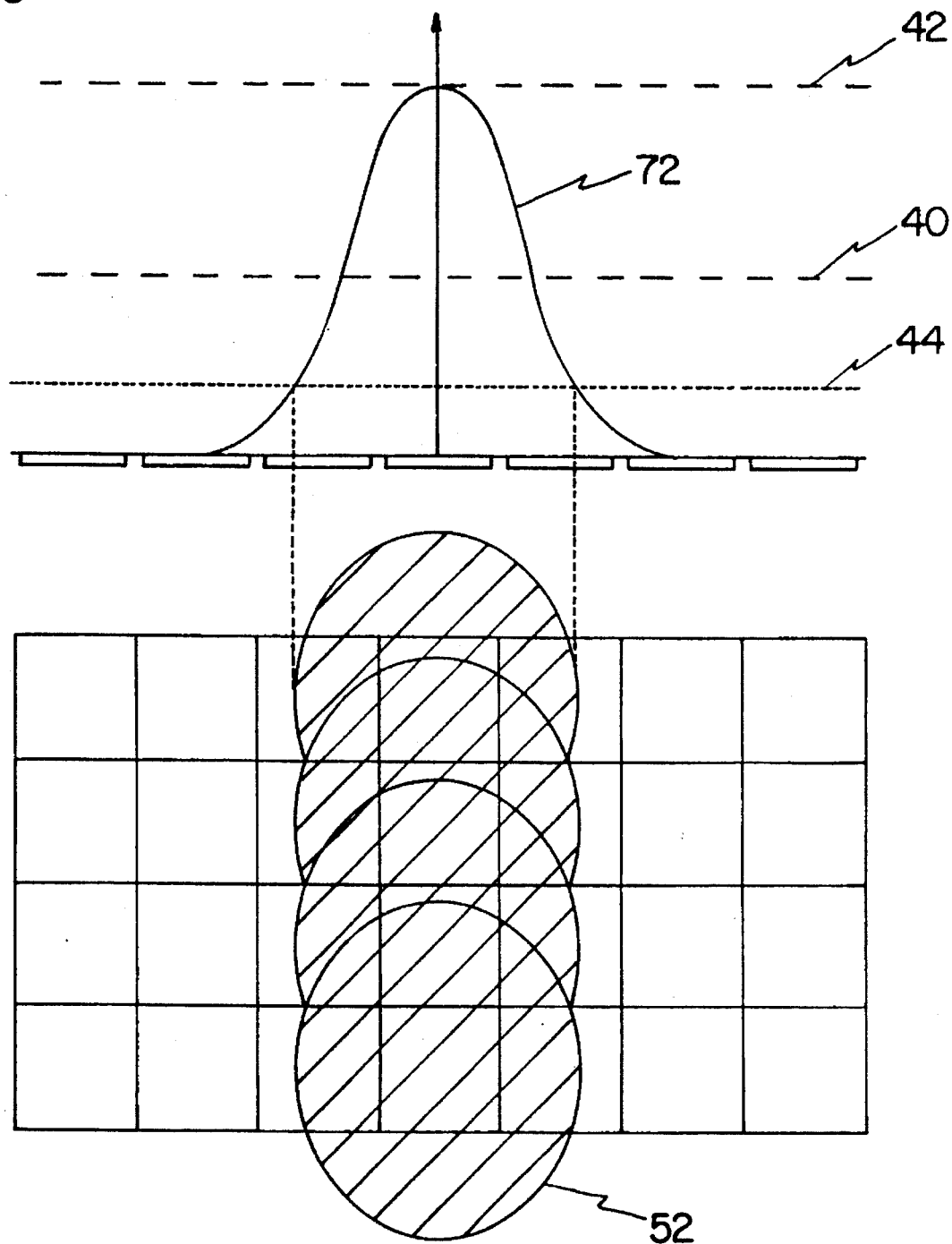
FIG. 6a is a pictorial graph similar to FIG. 6a showing an even larger pixel image produced in accordance with the present invention.
FIG. 6b is a pixel representation of the output image formed by application of the heat energy of FIG. 6a over a series of four lines.

In contrast to the existing focus on trying to compensate for drift in the heat energy curve 70 in order to obtain perfect pixel-to-pixel consistency, the present invention utilizes the phenomenon of varying the heat energy to its advantage. As shown in FIG. 5a, heat energy curve 72 which is generated by an over-drive energy has an apex that is above native pixel drive energy 40, but still below maximum drive transfer 42. By increasing the heat energy of curve 72, the overall area of pixel image 52, as shown in FIG. 5b, is substantially increased beyond the native area of pixel image 32. FIGS. 6a and 6b show the same effect as shown in FIGS. 5a and 5b, only heat energy curve 72 is operated just below maximum drive transfer point 42 to obtain the largest increase in size of pixel image 52 without incurring the drawbacks of melting or vaporizing which can occur above maximum drive transfer point 42. Although operating at this point can allow for a further increase in the size of pixel image 52, there is still a portion of the area which should be covered by pixel image 54 that cannot be affected by adjacent pixel image 52.

Figure 7A:
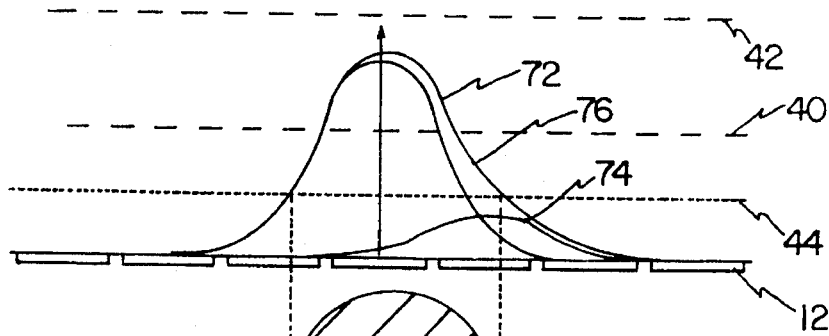
FIG. 7a is a pictorial graph similar to FIG. 5a showing a pixel image produced in accordance with an alternate embodiment of the present invention.
Figure 7B:
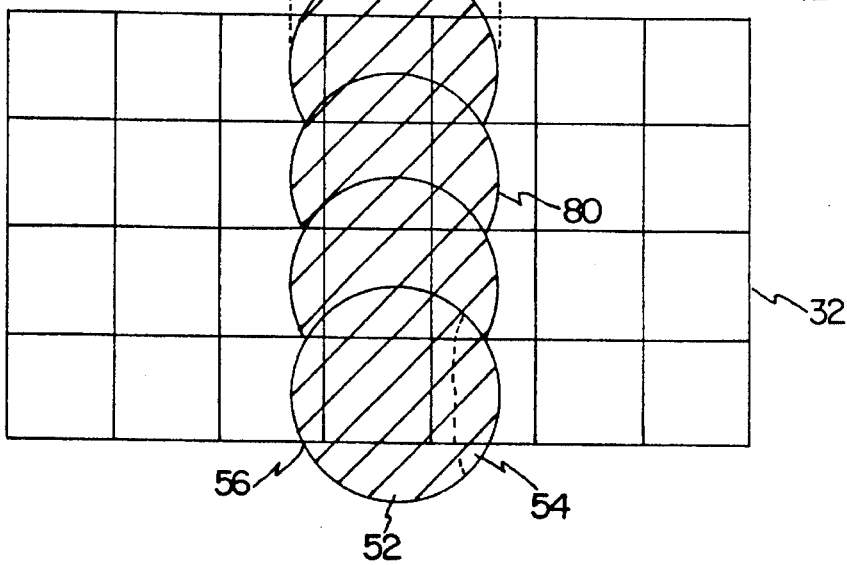
FIG. 7b is a pixel representation of the output image formed by application of the heat energy of FIG. 7a over a series of four lines.

Referring now to FIGS. 7a and 7b, the neighbor effect produced by overlapping heat energies between adjacent heating elements 12 driven by over-drive and under-drive energies will be described. Using this technique with the basic over-drive technique allows for coverage of portions of pixel image 54 which could not otherwise be obtained by affecting only the drive energy for adjacent pixel image 52. Heat energy curve 72 associated with an over-drive energy is thermally combined with heat energy curve 74 associated with an under-drive energy that is applied at about the same time as the over-drive energy to generate a combined heat energy curve 76 that produces a contiguous pixel image 56 covering both pixel image 52 and pixel image 54. As can be seen heat energy curve 74 is applied below threshold 44, and would not, by itself, produce an output pixel image. However, because of the fact that heat energy curve 74 is adjacent to heat energy curve 72 and is applied within a time frame not more than about 1 ms from the application of heat energy curve 72, the two curves combine to produce heat energy curve 76.

Figure 8A:
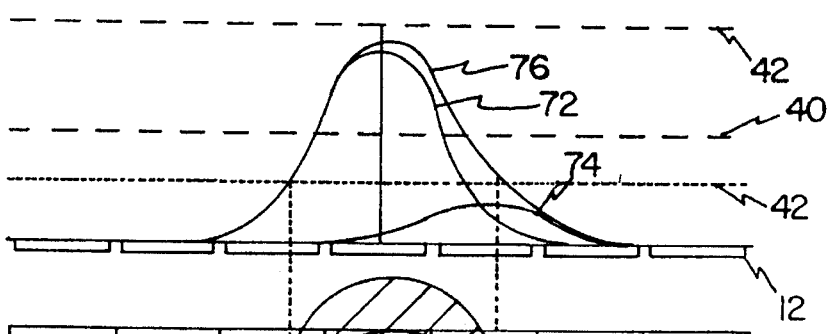
FIG. 8a is a pictorial graph similar to FIG. 7a showing a pixel image produced in accordance with another alternate embodiment of the present invention.
Figure 8B:
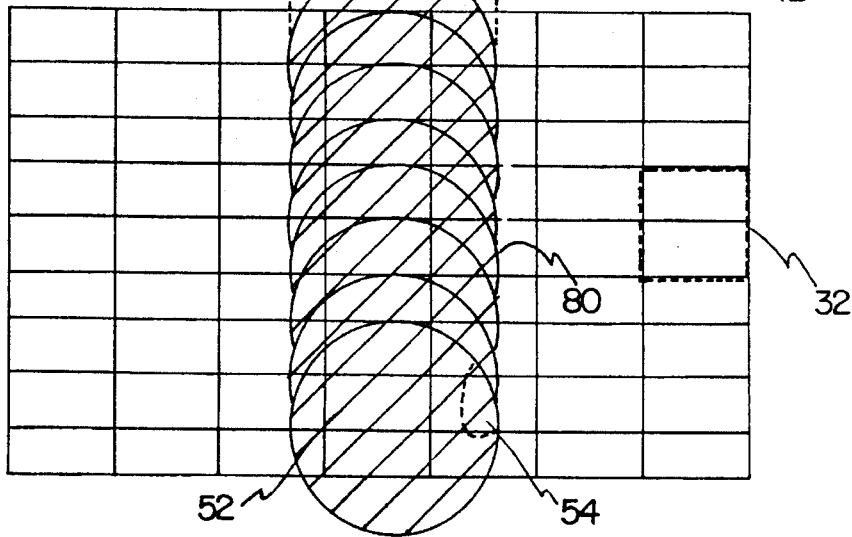
FIG. 8b is a pixel representation of the output image formed by application of the heat energy of FIG. 8a over a series of eight lines, each line being at a resolution twice that of FIG. 7b.

Referring now to FIGS. 8a and 8b, an embodiment of the neighbor effect option is shown being operated at a vertical resolution that is twice the native vertical resolution of pixel image 32. The operation at this higher vertical resolution is easily accomplished, for example, by decreasing the distance which print media 18 is moved by print head 10 for each print cycle. While this may increase the overall print time, a significant smoothing in the scalloped edges 80 can be achieved when comparing FIG. 7b to FIG. 8b.

In a preferred embodiment, the print cycle time of the present invention is slowed, and the drive energies are lower voltage pulses applied for longer times, as compared to a conventional binary thermal printer. In a conventional binary thermal printer, the native drive energy might be a 24 volt pulse applied for <1 ms to each heating element, for example, with a print cycle time between successive print lines of 5–10 ms. In contrast, a preferred embodiment of the present invention uses a 15 volt pulse applied for about 8 ms for the native drive energy. The over-drive energy is applied by using the 15 volt pulse for between 10–20 ms, and the underdirve energy is applied by using the 15 volt pulse for between 0.25–2.5 ms. The print cycle time is slowed to about 30 ms between successive print lines. By using a 20 ms maximum drive pulse and a 30 ms print cycle time, print head 10 has approximately 10 ms to cool down between successive print lines. Under these conditions, it has been observed that hysteresis control is not necessary to compensate to the prior heating history of the print head.

Figure 10A:
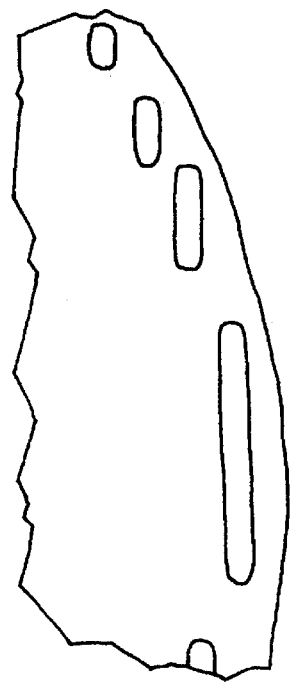
FIGS. 10a and 10b are magnified photographic representations of a sample output of a 400 dpi native resolution thermal printer in accordance with the present invention at 1200 and 2000 dpi effective resolution.
Figure 10B:
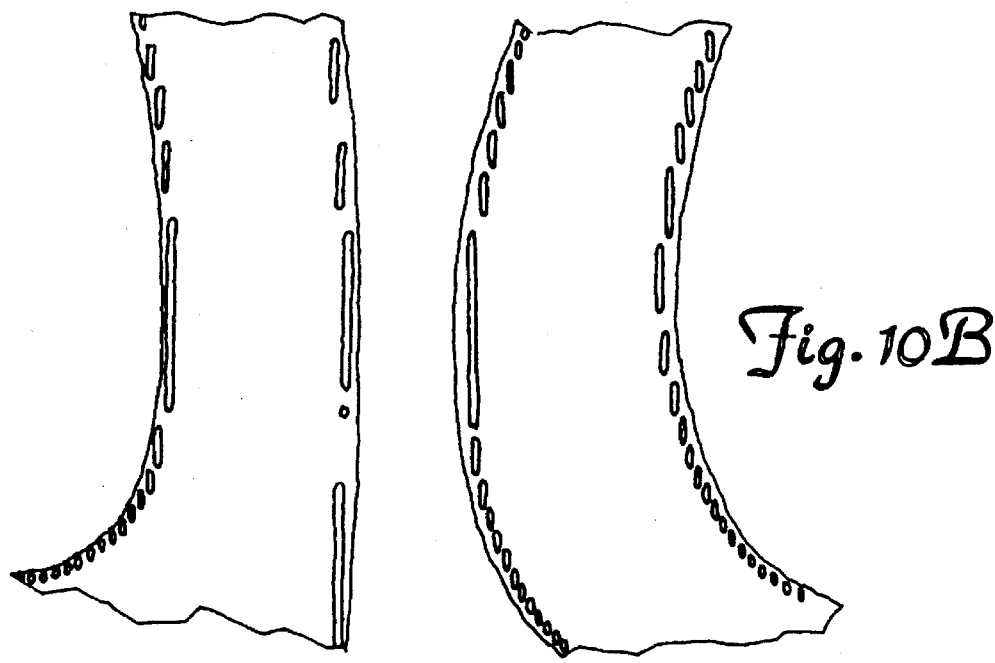

FIGS. 10a and 10b shows a photographic representation of a sample output produced on a film print media in accordance with the embodiment shown in FIGS. 8a and 8b at 1200 dpi and 1200 vertical by 2000 horiztonal dpi, respectively. In each of these photographs, the pixel images 52 and 54 which are altered by operation of the present invention are shown as lighter in these photographs for ease of representation.

Figure 9:
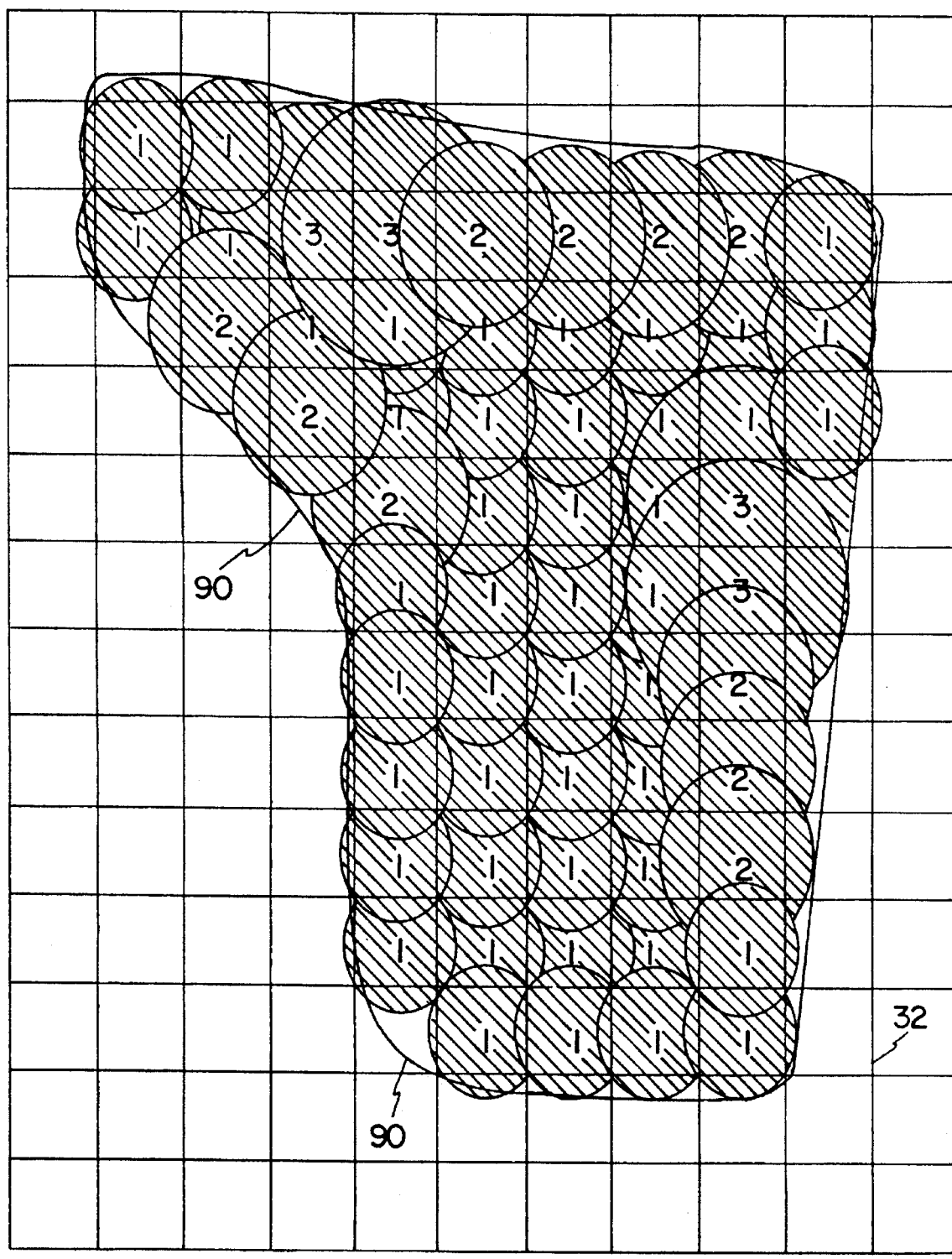
FIG. 9 is a pixel representation of a sample outline image rasterized and printed in accordance with the present invention.

FIG. 9 shows a sample output image 30 printed in accordance with the present invention. In this case output image 30 is supposed to occupy an area circumscribed by ideal outline 60. For each pixel image 32 in output image 30, a number (1, 2 or 3) indicates what type of drive energy was applied to the corresponding heating element 12. For all pixel values of 1, the drive energy is the native pixel drive energy 40. For all pixel values of 2, the drive energy is an over-drive energy of a first value creating heat energy curve 72 as shown in FIG. 5a, for example. For all pixel values of 3, the drive energy is an over-drive of a second value energy creating heat energy curve 72 as shown in FIG. 6a, for example. In this case, the determination of which drive energy to use is based on a simple comparison of the percentage of area of pixel element 12 which is within ideal outline 60. If the entire pixel element 12 is within ideal outline 60, and there are no adjacent pixel elements 12 which intersect with ideal outline 60, the drive energy is a 1. If there are adjacent pixel elements which intersect ideal outline 60, then a comparison is made to determine which pixel image (1 or 2) would produce the least proportion of error. Thus, at location 90, for example, drive energy 2 is used for both adjacent pixel images 32, whereas at location 92, drive energy 1 is used for both adjacent pixel images 32. When the overall proportion of error between output image 32 and ideal outline 60 is compared to the proportion of error that would have otherwise occurred if the present invention had not been utilized, it can be seen that the present invention results in an output image 32 that is significantly smoothed.

It will be understood that, while the principals described by the present invention are shown as pixel representations of black on white printing, the present invention is applicable to any color of marking material and print medium, as well as to the printing of multiple color images.

We claim:

1. An improved method for controlling a thermal printer that generates binary images on a print media by selectively heating or not heating a plurality of individual resistive heating elements arranged in a print line, each heating element being operable in response to a corresponding drive energy generated by a driver circuit that is operably coupled to a pixel representation of the image, the thermal printer having a native resolution across the print line that corresponds to a center-to-center distance between adjacent heating elements and having a native pixel drive energy that is applied to a heating element in order to produce a binary pixel image having a native area corresponding to the native resolution of the thermal printer, the improved method comprising the step of:

(a) providing each of one or more selected heating elements with an over-drive energy that is higher than the native pixel drive energy, but lower than a maximum drive energy for the thermal printer above which a thermal transfer of the binary pixel image will not consistently produce a uniform quality printed image, such that the binary pixel image on the print media corresponding to each of the selected heating elements is increased in area beyond the native area of the thermal printer thereby enabling the thermal printer to realize an increase in an effective resolution of the binary image.

2. The improved method of claim 1 wherein the increase in the effective resolution of the binary image is achieved by using the over-drive energy to control a relative position of a binary edge of the binary pixel image at a resolution that is higher than the native resolution of the thermal printer.

3. The improved method of claim 1 wherein the over-drive energy provided for each selected heating element is selectively chosen from a plurality of predefined over-drive energy levels.

4. The improved method of claim 1 further comprising the step of:

(b) providing each of one or more selected adjacent heating elements that are adjacent a corresponding selected heating elements of step (a) with an under-drive energy that is lower than the native pixel drive energy, such that the binary pixel image on the media corresponding to each of the selected adjacent heating elements is formed contiguously with the corresponding selected heating element and is smaller in area than the native area of the thermal printer.

5. The improved method of claim 4 wherein the over-drive energy that is provided to the corresponding selected heating elements of step (a) is provided during a first time that is less than 1 ms apart from a second time during which the under-drive energy is provided to the selected adjacent heating elements of step (b).

6. The improved method of claim 4 wherein step (b) is performed if a proportion of an area of a pixel to be printed that corresponds to the selected adjacent heating element is greater than a first percentage of the native area and less than a second percentage of the native area, the second percentage being greater than the first percentage.

7. The improved method of claim 6 wherein the proportion of the area of the pixel is compared to more percentages than just the first and second percentage and wherein the under-drive energy provided for each selected adjacent heating elements is chosen from a plurality of predefined under-driven energy levels.

8. The improved method of claim 6 wherein the under-driven energy for a selected adjacent heating element and the over-drive energy for the corresponding selected heating element are determined as a pair of values based upon the proportion of the area of the pixel to be printed corresponding to the selected adjacent heating element.

9. The improved method of claim 8 wherein the proportion of the area of the pixel is compared to more percentages than just the first and second percentage and wherein the pair of values for the under-drive energy and the over-drive energy is chosen from a plurality of predefined pairs of energy levels.

10. The improved method of claim 1 further comprising the step of:

(b) decreasing a distance which the print media is moved past the print line of the thermal printer on each of a plurality of print cycles to a distance that is less than a distance which the print media is moved at the native resolution of the thermal printer.

11. The improved method of claim 4 further comprising the step of:

(c) decreasing a distance which the print media is moved past the print line of the thermal printer on each of a plurality of print cycles to a distance that is less than a distance which the print media is moved at the native resolution of the thermal printer.

12. A method for rendering and outputting a line art image to a thermal printer that generates binary images on a print media by selectively heating or not heating a plurality of individual resistive heating elements arranged in a print line, each heating element being operable in response to a corresponding drive energy generated by a driver circuit that is operably coupled to a pixel representation of the line art image, the pixel representation comprising a plurality of raster scan lines, each raster scan line having a plurality of pixel elements, each pixel element corresponding to a unique heating element in the print line, the thermal printer having a native resolution across the print line that corresponds to a center-to-center distance between adjacent heating elements and having a native pixel drive energy level that is applied to a heating element in order to produce a binary pixel image having a native area corresponding to the native resolution of the thermal printer, the method comprising the steps of:

(a) providing a processor with an ideal outline of the line art image;

(b) using the processor to rasterize the ideal outline of the line art image to store the pixel representation of the line art image in a frame buffer memory, including performing the following steps for each raster scan line in the pixel representation:

(b1) determining whether there are any outline boundaries where the ideal outline crosses the raster scan line;

(b2) for any pixel elements in the raster scan line which are completely outside an outline boundary, storing a pixel drive value in the frame buffer memory corresponding to that pixel element which results in a drive energy that generates no binary pixel image;

(b3) for any pixel elements which are partly inside an outline boundary, storing a pixel drive value in the frame buffer memory corresponding to an adjacent pixel element that is completely inside the outline boundary which results in an over-drive energy that is higher than the native pixel drive energy, but lower than a maximum drive energy for the thermal printer above which a thermal transfer of the binary pixel image will not consistently produce a uniform quality printed image; and (b4) for all other pixel elements which are completely inside an outline boundary, storing a pixel drive value in the frame buffer memory corresponding to that pixel element which results in a drive energy that is equivalent to the native pixel drive energy; and (c) communicating the pixel representation stored in the frame buffer memory to the thermal printer such that the thermal printer may print the smoothed line art image.

13. The method of claim 12 wherein the smoothed line art image is achieved by using the over-drive energy to control a relative position of a binary edge of the binary pixel image at a resolution that is higher than the native resolution of the thermal printer.

14. The method of claim 12 wherein the pixel drive value stored for each adjacent pixel in step (b3) is chosen from a plurality of predefined pixel drive values.

15. The method of claim 12 wherein step (b3) further comprises the steps of:

(b31) determining a proportion of an area of the pixel element that is inside the outline boundary;

(b32) if the proportion of the area of the pixel element is greater than a first percentage of the native area and less than a second percentage of the native area that is greater than the first percentage, storing a pixel drive value in the frame buffer memory corresponding to that pixel element which results in an under-drive energy that is less than the native pixel drive energy.

16. The method of claim 15 wherein the pixel drive value that is stored for the adjacent pixel elements of step (b3) results in an over-drive energy applied to the corresponding heating element that is maintained during a first time that is less than 1 ms apart from a second time during which the under-drive energy is applied to the corresponding heating element for the adjacent pixel elements of step (b32).

17. The method of claim 15 wherein the proportion of area of the pixel element is compared to more percentages than just the first and second percentage and wherein the pixel drive value stored for each adjacent pixel element in step (b32) is chosen from a plurality of predefined pixel drive values.

18. The method of claim 15 wherein the pixel drive value that results in the under-drive energy for an adjacent pixel element in step (b32) and the pixel drive value that results in an over-drive energy for the corresponding pixel element in step (b3) are determined as a pair of pixel drive values based upon the proportion of the area of the adjacent pixel element in step (b32).

19. The method of claim 18 wherein the proportion of the area is compared to more percentages than just the first and second percentage and wherein the pair of pixel drive values is chosen from a plurality of predefined pairs of pixel drive values.

20. The method of claim 12 further comprising the step of:

(d) decreasing a distance which the print media is moved past the print line of the thermal printer on each of a plurality of print cycles to a distance that is less than a distance which the print media is moved at the native resolution of the thermal printer.

21. The method of claim 15 further comprising the step of:

(d) decreasing a distance which the print media is moved past the print line of the thermal printer on each of a plurality of print cycles to a distance that is less than a distance which the print media is moved at the native resolution of the thermal printer.

22. A method for smoothing images printed by a thermal printer that generates binary images on a print media by selectively heating or not heating a plurality of individual resistive heating elements arranged in a print line, each heating element being operable in response to a corresponding drive energy generated by a driver circuit that is operably coupled to a pixel representation of an image, the pixel representation comprising a plurality of raster scan lines, each raster scan line having a plurality of pixel elements, each pixel element corresponding to a unique heating element in the print line, the thermal printer having a native resolution across the print line that corresponds to a center-to-center distance between adjacent heating elements and having a native pixel drive energy level that is applied to a heating element in order to produce a binary pixel image having a native area corresponding to the native resolution of the thermal printer, the method comprising the steps of:

(a) providing a controller with the pixel representation of the image, each pixel element in the pixel representation having a binary pixel value;

(b) using the controller to smooth the binary image to be printed on the print media by performing for each pixel element the steps of:

(b1) for a subset of pixel elements within the pixel representation that are about the pixel element currently being processed, determining if the pixel values of the subset of pixel elements match any one of a plurality of predefined template patterns;

(b2) if there is no match from step (b1) and if the pixel value of the pixel element currently processed is zero, applying a drive energy to the heating element corresponding to the pixel element currently being processed that will produce no binary pixel image;

(b3) if there is no match from step (b1) and if the pixel value of the pixel element currently processed is one, applying a drive energy to the heating element corresponding to the pixel element currently being processed that is equivalent to the native pixel drive energy; and (b4) if there is a match from step (b1), applying an over-drive energy to the heating element corresponding to a pixel element adjacent to the pixel element currently being processed that is higher than the native pixel drive energy, but lower than a maximum drive energy for the thermal printer above which a thermal transfer of the binary pixel image will not consistently produce a uniform quality printed image.

23. The method of claim 22 wherein the smoothed image is achieved by using the over-drive energy to control a relative position of a binary edge of the binary pixel image at a resolution that is higher than the native resolution of the thermal printer.

24. The method of claim 22 wherein step (b4) comprises the steps of:

(b41) if there is a match from step (b1), determining if the template which matched is for an over-drive or under-drive condition;

(b42) if the match is for an over-drive condition, applying an over-drive energy to the heating element corresponding to a pixel element adjacent to the pixel element currently being processed that is higher than the native pixel drive energy, but lower than a maximum drive energy for the thermal printer; and (b32) if the match is for an under-drive condition, applying an under-drive energy that is less than the native pixel drive energy.

25. The method of claim 24 wherein the over-drive energy applied to the corresponding heating element is maintained during a first time that is less than 1 ms apart from a second time during which the under-drive energy is applied.

26. A thermal print head controller for receiving source image information and providing drive energy to a thermal print head having a plurality of heating elements for generating binary images on print media, the controller comprising:

means providing a plurality of drive energies; and means responsive to the source image information to selectively supply the drive energy to selected heating elements for generating different sized binary image portions with at least one of the binary image portions formed by drive energies provided by more than one heating elements.

27. The thermal print head controller of claim 26 wherein means for providing a plurality of drive energies is a driver circuit.

28. The thermal print head controller of claim 26 wherein means for providing drive energy includes means responsive to the source image information to select a drive energy in a range of drive energies from zero to a maximum drive energy where thermal breakdown of one of print media and thermal print head occurs.

29. The thermal print head controller of claim 26 wherein the at least one of the binary image portions is formed by adjacent heating elements.

30. A method for controlling a thermal print head having a plurality of heating elements for providing a binary image based on source image information, the method comprising:

selecting a drive energy for each of the plurality heating elements based on the source image information; and providing the selected drive energy to each respective heating elements of the thermal print head so that adjacent heating elements together heat print media portions to form different sized binary image portions.

31. A thermal print head controller for receiving source image information and providing drive energy to a thermal print head having a plurality of heating elements for generating binary images on print media, the controller comprising:

a driver circuit connected to a thermal print head for providing a plurality of different drive energies thereto with each of the plurality of different drive energies designed to produce a plurality of different heat energies; and means responsive to the source image information to selectively supply drive energy to selected heating elements for generating different sized binary image portions with at least one of the binary image portions formed by more than one heating element.

32. A thermal print head controller for receiving source image information and providing drive energy to a thermal print head having a plurality of heating elements for generating binary images on print media, the controller comprising:

a driver circuit connected to a plurality of heating elements for selectively providing a first and second pixel drive energy having first and second binary image areas associated therewith to the plurality of heating elements, the first pixel drive energy is greater than the second pixel drive energy;

driver circuit control means responsive to the source image for selectively providing first and second pixel drive energies to the plurality of heating elements, the first and second pixel drive energies together produce an enlarged binary image area greater than each of the first and second binary image areas.

33. A thermal print head controller for receiving source image information and providing drive energy to a thermal print head having a plurality of heating elements for generating binary images on print media, the controller comprising:

a driver circuit configured for connection to a plurality of heating elements for providing a plurality of different drive energies with each of the plurality of different drive energies designed to produce a plurality of different heat energies; and means responsive to the source image information to selectively supply drive energy to selected heating elements so that different heat energies produced by different heating elements combine to produce binary image portions of different sizes.

* * * * *